No. 765,829. PATENTED JULY 26, 1904.
F. W. GIDEON.
RAILWAY SIDE LINE SOD CUTTER.
APPLICATION FILED JUNE 7, 1904.
NO MODEL.
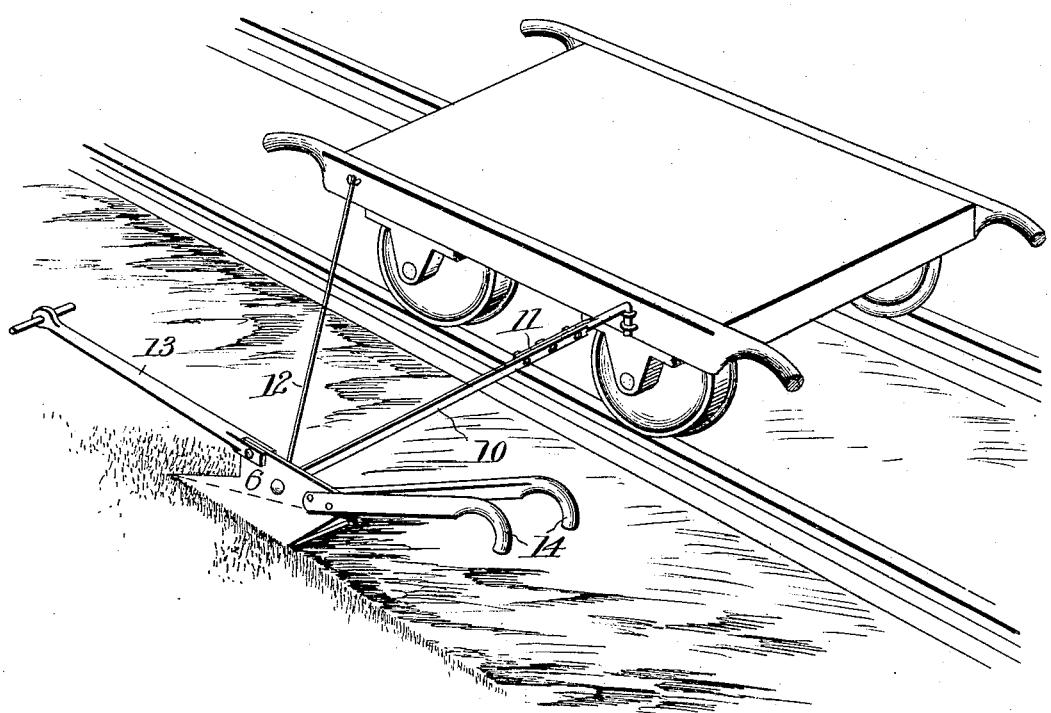
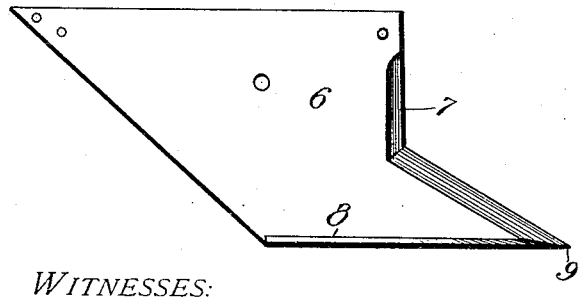
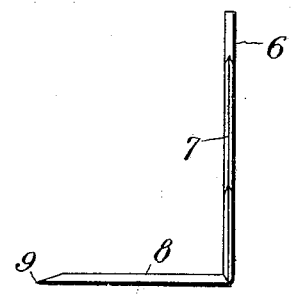
WITNESSES:
INVENTOR
Frederick W. Gideon
BY
Milo B. Stevens & Co.
Attorneys No. 765,829. Patented July 26, 1904.

UNITED STATES PATENT OFFICE.

FREDERICK W. GIDEON, OF MOUNT CLEMENS, MICHIGAN.

RAILWAY SIDE-LINE SOD-CUTTER.

SPECIFICATION forming part of Letters Patent No. 765,829, dated July 26, 1904.

Application filed June 7, 1904. Serial No. 211,489. (No model.)

*To all whom it may concern:*

Be it known that I, FREDERICK W. GIDEON, a citizen of the United States, residing at Mount Clemens, in the county of Macomb and State of Michigan, have invented new and useful Improvements in Railway Side-Line Sod-Cutters, of which the following is a specification.

This invention is a device for cutting the sod by the side of railroad-tracks on a line parallel therewith and at the desired distance therefrom.

The object of the invention is to produce an improved device of the kind characterized particularly by simplicity of construction and a capability of manipulation which will render it useful in practically all places.

The device includes a blade of peculiar shape which cuts the sod at the side line and also underneath, whereby it is loosened, so that it may be removed without difficulty. This blade is guided by hand and may be drawn by hand or by attachment to a hand-car, or by both combined.

In the accompanying drawings, Figure 1 is a perspective view of the device applied to a hand-car. Figs. 2 and 3 are respectively a side elevation and front elevation of the blade.

Referring specificallly to the drawings, the blade or share comprises a vertical part or landside 6, which is sharpened at the front edge, as at 7, and a horizontal portion 8, which presents an inclined sharpened edge, as at 9. The blade is preferably made of a single piece of metal bent in the proper form. The landside 6 acts to cut the sod from the standing part, while the flat horizontal portion 8 runs under the cut portion of the sod and detaches it from the ground, so that it may be readily shoveled or picked up and removed.

The plate just described is connected to the hand-car by a bar 10, which is adjustable in length, being formed in sections which lap, as at 11, with a series of holes and bolts to fasten the sections together at desired adjustment. This permits the distance of the sod-cutter with respect to the hand-car, and consequently the side line with respect to the track, to be varied as desired. A draft-rod 12 is also connected between the cutter and hand-car.

To assist in drawing and manipulating the cutter, it is provided at the front with a pivoted tongue 13, on which one or two men may pull, and at the rear with a pair of handles 14, whereby it may be guided or lifted from the ground at any place where it is desired to skip. By reason of the variation of inclination of the shoulder or side slope of a track-bed a certain amount of hand work or guidance is desirable for best results, and the handles and tongue referred to afford convenient means for doing this.

The device may be very cheaply constructed and is free from objectionable, heavy, or complicated parts. It is capable of being made entirely by a section hand or boss of ordinary intelligence with the tools and material at his disposal, or it may be turned out in quantities at small cost.

What I claim as new, and desire to secure by Letters Patent, is—

A railway side-line sod-cutter suitable for attachment to a car, comprising a blade having vertical and horizontal cutting portions, the latter being constructed to cut under and loosen a sod strip cut off by the former, a spacing-bar extending from the blade to the car, and handles connected to the blade.

In testimony whereof I have signed my name to this specification in the presence of two subscribing witnesses.

FREDERICK W. GIDEON.

Witnesses:
 ELIZABETH J. PRICE,
 LILLIAN A. SPARKLIN.